(12) United States Patent
Bunde

(10) Patent No.: US 8,919,822 B2
(45) Date of Patent: Dec. 30, 2014

(54) FITTING SYSTEM FOR A HYDRAULIC TUNING CABLE

(75) Inventor: Christopher M. Bunde, Whitehouse, OH (US)

(73) Assignee: Eaton Corporation, Cleveland, OH (US)

( * ) Notice: Subject to any disclaimer, the term of this patent is extended or adjusted under 35 U.S.C. 154(b) by 446 days.

(21) Appl. No.: 13/178,794

(22) Filed: Jul. 8, 2011

(65) Prior Publication Data

US 2012/0005877 A1 Jan. 12, 2012

Related U.S. Application Data

(60) Provisional application No. 61/363,424, filed on Jul. 12, 2010.

(51) Int. Cl.
*F16L 33/00* (2006.01)
*F16L 33/207* (2006.01)
*F16L 55/033* (2006.01)

(52) U.S. Cl.
CPC ......... *F16L 55/0331* (2013.01); *F16L 33/2076* (2013.01)
USPC .............................. 285/256; 60/469; 181/233

(58) Field of Classification Search
USPC ..................... 285/247, 256; 60/469; 417/312; 181/233, 207
See application file for complete search history.

(56) References Cited

U.S. PATENT DOCUMENTS

| | | | |
|---|---|---|---|
| 2,059,920 A * | 11/1936 | Weatherhead, Jr. | 285/247 |
| 2,375,614 A * | 5/1945 | Berger et al. | 285/247 |
| 2,548,965 A * | 4/1951 | Gaugler | 181/233 |
| 3,063,470 A | 11/1962 | Forster | |
| 3,323,305 A * | 6/1967 | Klees | 181/207 |
| 3,380,480 A | 4/1968 | Bleasdale | |
| 4,303,263 A | 12/1981 | Legris | |
| 4,540,225 A * | 9/1985 | Johnson et al. | 439/192 |
| 4,611,633 A | 9/1986 | Buchholz et al. | |
| 4,671,380 A | 6/1987 | Henderson et al. | |
| 4,809,751 A | 3/1989 | McKenzie | |
| 4,991,876 A * | 2/1991 | Mulvey | 285/256 |
| 5,201,343 A | 4/1993 | Zimmermann et al. | |
| 5,495,711 A * | 3/1996 | Kalkman et al. | 60/469 |
| 5,539,164 A | 7/1996 | van Ruiten | |
| 5,582,006 A * | 12/1996 | Phillips | 60/469 |
| 5,728,981 A * | 3/1998 | van Ruiten | 181/233 |

(Continued)

FOREIGN PATENT DOCUMENTS

| | | |
|---|---|---|
| EP | 1486717 A1 | 12/2004 |
| WO | WO-03095886 A1 | 11/2003 |

OTHER PUBLICATIONS

International Search Report, PCT/IB2011/001625, Filed Dec. 28, 2011.

*Primary Examiner* — David E Bochna
(74) *Attorney, Agent, or Firm* — Rader, Fishman & Grauer PLLC

(57) ABSTRACT

A tuning cable for hydraulic system noise reduction is secured to a secondary fitting where the secondary fitting is mounted in a primary fitting using a pressed-in fit, a threaded connection or a slip fit after a tuning cable is installed in the secondary fitting by crimping the secondary fitting. The primary fitting is secured to a hydraulic connector which is also secured to a hydraulic hose to form a hydraulic hose assembly. In an alternative embodiment the secondary fitting is slipped directly into the hydraulic connector.

18 Claims, 4 Drawing Sheets

(56) References Cited

U.S. PATENT DOCUMENTS

| | | |
|---|---|---|
| 5,791,141 A | 8/1998 | Phillips |
| 6,131,613 A | 10/2000 | Jenski, Jr. et al. |
| 6,447,017 B1 * | 9/2002 | Gilbreath et al. ............. 285/256 |
| 6,494,496 B1 | 12/2002 | Sweeney |
| 6,688,423 B1 | 2/2004 | Beatty et al. |
| 6,917,907 B2 | 7/2005 | Hsi et al. |
| 7,000,728 B2 | 2/2006 | Drouet |
| 7,007,718 B2 | 3/2006 | Chen et al. |
| 7,017,610 B2 | 3/2006 | Zimpfer et al. |
| 7,325,570 B1 * | 2/2008 | Krieger ......................... 181/232 |
| 7,373,824 B2 | 5/2008 | Krieger et al. |
| 8,360,478 B2 * | 1/2013 | Hurwitz et al. ............... 285/247 |
| 8,496,087 B2 * | 7/2013 | McKenzie et al. ............ 181/233 |
| 2010/0007134 A1 | 1/2010 | Elton et al. |

\* cited by examiner

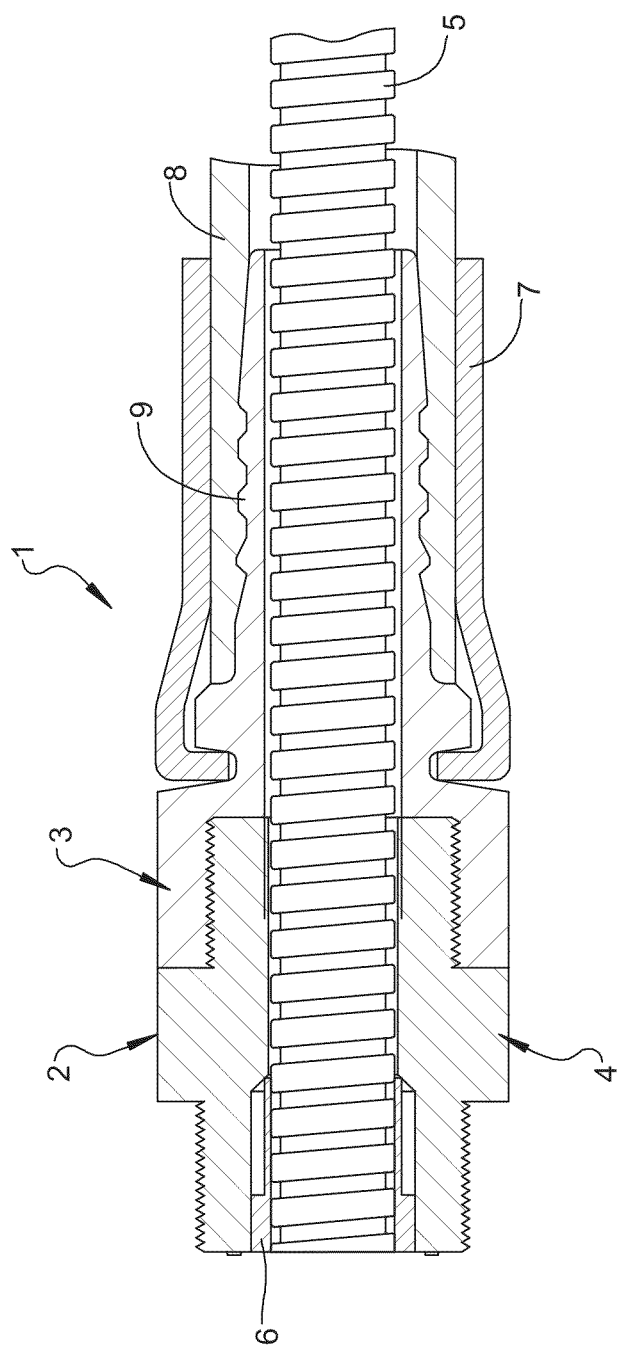

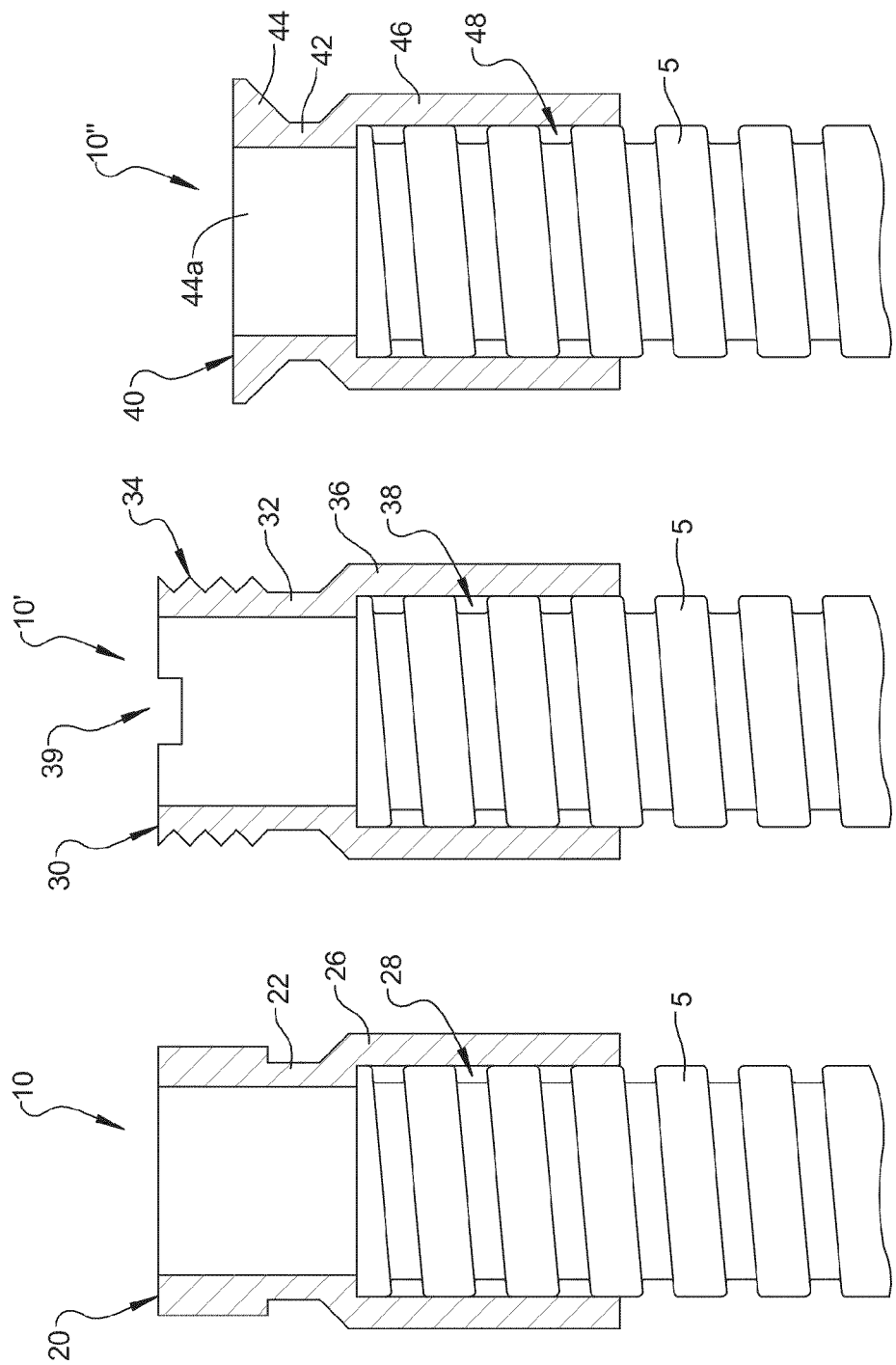

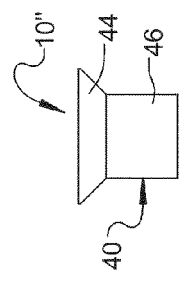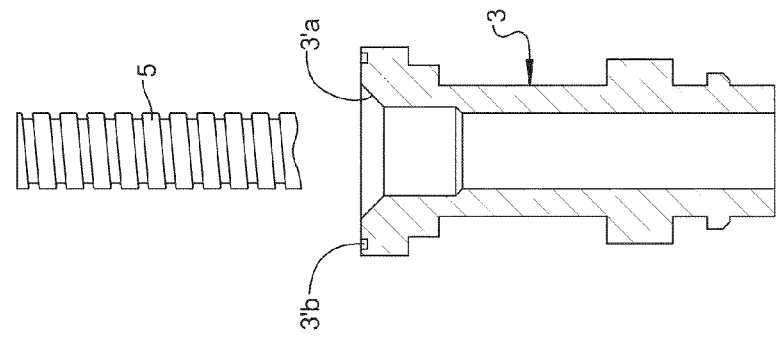
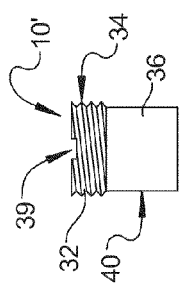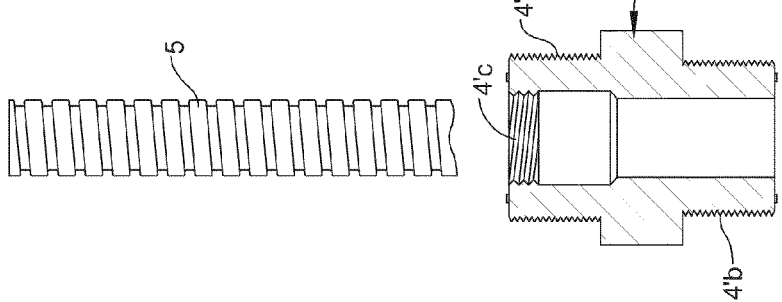
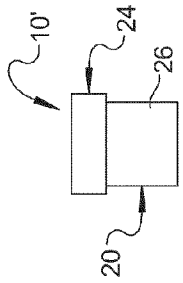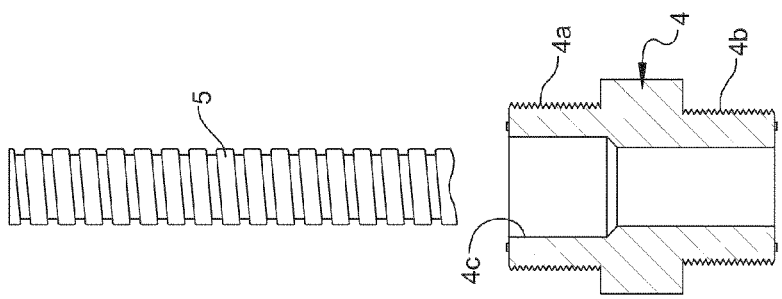

FITTING SYSTEM FOR A HYDRAULIC TUNING CABLE

CROSS-REFERENCE TO RELATED CASES

This application claims the benefit of provisional application Ser. No. 61/363,424, filed on Jul. 12, 2010. This application is related to application Ser. No. 13/178,832, filed on the same day as this Application and to application Ser. No. 13/178,849, also filed on the same day as this Application.

TECHNICAL FIELD

The present invention relates to suppression of fluid system noise using a tuning cable within a fluid conveyance hose and more particularly to the structure and method of attaching the tuning cable to a fitting for connection to a pump or other pressurized fluid component.

BACKGROUND

Fluid borne noise generated within a pressurized hydraulic system which uses a pump such as an automotive power steering system, can cause undesired noise and vibration. The oscillating pressure ripples generated by the hydraulic pump are carried within the hydraulic hose and tubing and cause other components to vibrate and emit noise. The use of a tuning tube mounted within a fluid conveyance hose to attenuate these pressure oscillations is known in the art with a description of such of system in U.S. Pat. No. 3,323,305 entitled Attenuation Device and issued to G. Klees on Jun. 6, 1967. The fluid noise reduction structure of the prior art comprises a flexible metal tube, called a tuning cable, that is attached to a hydraulic connector and then placed inside a section of hydraulic hose. The hose is usually permanently attached to the connector by crimping a socket attached to the connector. The tuning cable can incorporate fluid leakage through a corrugated wall and/or the tuning cable can have holes formed along its length to increase the level of attenuation of the pressure pulses and hence, the level of generated noise. The material used for the tuning cable is usually a flexible metal assembly known as a corrugated tube, or it can be made of other similar materials.

The length or other geometry of the tuning cable must be specifically selected to provide the highest level of attenuation depending on the frequencies generated by the pump and the natural vibration frequencies of the various components. Sometimes this can be empirically determined but even then, trial and error is used to determine the exact correct length of the tuning tube along with the location and size of any holes or other apertures along its length. Thus, it would be desirable to have a development system that would permit the tuning tube to be easily changed without building a whole new hose assembly. The prior art systems require that a new hydraulic hose be made each time that the design of the tuning tube is revised which is time consuming and expensive.

The tuning tube can be a corrugated metal wall tube or it can be a tube built up of joined sections with a discontinuous wall construction that results in a distributed leakage along the length of the tuning cable. Or, it can be made of a continuous tube with or of a continuous tube that has apertures formed along its length. The tube can be made of metal or of a suitable plastic material. The fitting used at the end of the hydraulic hose to attach the tuning tube varies depending on the type of material and wall structure that is used for the tuning cable. If the tuning tube is made of a plastic tube material, the tube is commonly slipped over a relatively short barbed tube nipple extending from a hose nipple extension as part of the fitting. The hose is then attached to the fitting using a crimped socket that is mounted on the fitting. Thus, according to the prior art, the length or other design geometry of the tuning tube cannot be changed without destroying the hose assembly. A new assembly with the new tuning tube must be made each time to change the length or other design features of the tuning cable, with is time consuming and expensive.

SUMMARY

The exemplary tuning cable assembly is a metal tube which is preferably a corrugated or wrapped metal tube having a level of fluid leakage through its walls. It is attached to a hydraulic primary fitting using a secondary fitting that is held in the primary fitting using mating threads, a press-in fit or a slip fit with entrapment by another system connector. This design permits the primary fitting holding the tuning cable to be easily removed from the connector and then a different primary fitting, secondary fitting and tuning cable can be re-assembled to the connector without disturbing the hydraulic hose. Or, if the secondary fitting is a slip fit or threaded into the secondary fitting, the secondary fitting along with the attached tuning cable can be removed from the primary fitting and a new secondary fitting with an attached tuning cable installed into the primary secondary fitting. In these embodiments, the primary fitting remains installed in the connector.

The metal tuning cable can be retained within the secondary fitting using a crimping process on the outside wall of the secondary fitting. The secondary fitting can be retained within the primary fitting using threads, a press fit or a slip fit. In the case of a slip fit, the secondary fitting can have a frustoconical inlet shape to provide a sealing and retention function with another system component. Other shapes and sealing methods can be utilized such as a flat face using a fluid seal between the secondary fitting and the other system component.

Using the tuning cable and fittings of the exemplary tuning cable assembly the tuning cable can be easily modified in an effort to tune the cable to maximize the noise attenuation in each installation without building a new hose assembly. Using the exemplary tuning cable assembly, after the primary fitting with the secondary fitting and the attached tuning cable is removed from the connector, the primary fitting with a modified tuning cable can be inserted into the connector then reconnected to the hydraulic system for evaluation and testing for noise reduction levels. In the alternative, the secondary fitting along with the tuning cable can be removed from the primary connector and another tube with a different geometry can be fitted to the secondary connector. Then the secondary connector and the attached tube are inserted into the primary connector and that tuning tube assembly is reassembled to the connector.

In a first embodiment, a threaded sleeve is used to attach the secondary fitting including the tuning cable to the primary fitting. The tuning cable is held in a receiving section formed in the secondary fitting using a mechanical or adhesive type of retention methods. As an alternative to crimping, other methods can be used to attach the tuning cable to the secondary connector such as a retaining pin or adhesives or a crush collet which are contemplated and fall within the scope of this disclosure.

It is shown that during assembly, the tuning cable is inserted into a receiving section formed in the threaded secondary fitting and the shank of the secondary fitting is crimped onto the tuning cable. The tuning cable can be a corrugated metal tube or a straight metal tube or a spiral metal tube with or without a controlled leakage path at its outer surface. This tuning cable and threaded sleeve is then attached to the primary fitting, using mating threads between the outer surface of the secondary fitting and the inner surface of the connector thereby forming a tuning cable assembly. The tuning cable assembly is then threaded into the hydraulic connector or otherwise retained with any known method. The connector commonly is attached to a hydraulic hose using a nipple and a socket where the socket is crimped onto the hose. The hose is clamped between the socket and the nipple thereby completing the hydraulic hose assembly. To change the tuning cable, the connector is disconnected from the hydraulic system and either the primary fitting along with the secondary fitting and tuning cable can be removed from the connector or the primary fitting can be left in the connector and the secondary fitting and tuning cable can be removed for replacement.

In a second embodiment, a secondary fitting is designed to be a press fit into the central cavity of the primary fitting. The tuning cable is inserted into a receiving cavity formed in the secondary fitting and held in position using a crimping process on the outside of the secondary fitting to deform the receiving cavity to clamp the tuning cable in position in the secondary fitting. The secondary fitting is then pressed into the primary fitting to complete the tuning cable assembly. The tuning cable assembly is then threaded into the hydraulic connector. To remove the tuning cable, the primary fitting along with the secondary fitting and the tuning cable (tuning cable assembly) is removed from the connector. In this manner, the tuning cable assembly can be easily replaced with one having a different tuning cable without rebuilding the whole hydraulic hose assembly.

In a third embodiment, a secondary fitting is designed to include an inlet having a frustoconical profile that mates and seals with another hydraulic system component connector. The secondary fitting includes a receiving cavity where the tuning cable is commonly held in the receiving cavity by crimping. The secondary fitting is then slipped into the primary fitting to form the tuning cable assembly. The tuning cable assembly is then threaded or otherwise held in the hydraulic connector. Using this embodiment, the tuning cable assembly can be easily changed by disconnecting the connector from the hydraulic system, then pulling out the secondary fitting with the attached tuning cable. A different secondary fitting and new tuning cable can then be inserted into the primary fitting which remains attached to the connector.

BRIEF DESCRIPTION OF THE DRAWINGS

FIG. 1 is a cross-sectional view of the exemplary tuning cable assembly installed in a connector which is attached to a hydraulic hose;

FIG. 2 is a partial cross-section of a first embodiment of the exemplary tuning cable retention structure of the subject tuning cable assembly;

FIG. 3 is a partial cross-section of a second embodiment of the exemplary tuning cable retention structure of the subject tuning cable assembly;

FIG. 4 is a partial cross-section of a third embodiment of the exemplary tuning cable retention structure of the subject tuning cable assembly;

FIG. 5 is an exploded view of a first embodiment of the exemplary cable retention structure;

FIG. 6 is an exploded view of a second embodiment of the exemplary cable retention structure;

FIG. 7 is an exploded view of a third embodiment of the exemplary cable retention structure;

DETAILED DESCRIPTION

Figure 10:
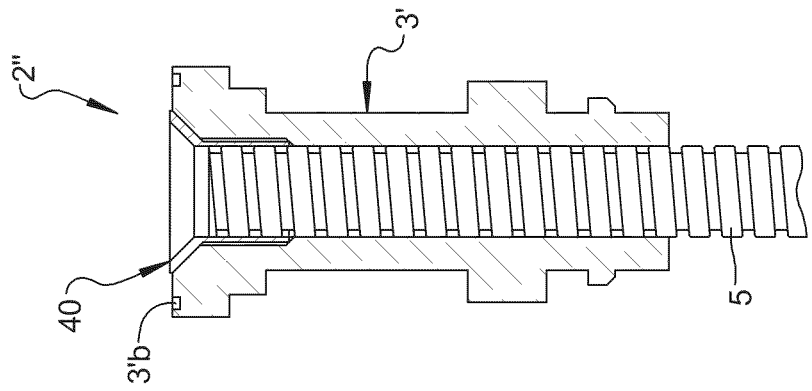
FIG. 10 is a cross-sectional view of the third exemplary tuning cable assembly.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a cross-sectional view of a hydraulic hose assembly 1 is shown which includes the exemplary tuning cable assembly 2. A hydraulic connector 3 is attached to the tuning cable assembly 2 to the primary fitting 4 by mating threads although other attachment methods such as adhesives or snap rings could be used equally as well. The primary fitting 4, having a central cavity, is attached to the tuning cable 5 through use of the secondary fitting 6. The tuning cable 5 is inserted into the secondary fitting 6 and the secondary fitting 6 is crimped to hold the tuning cable 5. Thus, the primary fitting 4 can be unthreaded from the connector 3 and the tuning cable assembly 2 can be removed and replaced without destroying the hose assembly 1. After reassembly of the primary fitting 4 to the connector 3, the connector 3 is attached to another component or connector in the hydraulic system. The tuning cable is typically made of a flexible metal tube that is corrugated. The corrugated tube can have fluid leakage along its length or it can be leak proof with a fluid exit at one end. The tuning cable 5 shown as a metal corrugated tube is attached to a secondary fitting 6.

Now referring to FIG. 2 of the drawings, the exemplary tuning cable retention structure 10 of the subject tuning cable assembly 2 is shown. The tuning cable retention structure 10 includes a secondary fitting 20 having an upper section 22 having a press collar section 24 and a lower section 26 which includes a receiving cavity 28 for insertion of a tuning cable 5 which is shown as a corrugated metal tube but other tube configurations could be used. The tuning cable 5 is inserted into the receiving cavity 28 and then the lower section 26 is crimped onto the tuning cable 5 to hold it in position in the lower section 26 thereby forming the tuning cable retention structure 10. The tuning cable retention structure is connected to a hydraulic connector 3 (see FIG. 1). The press collar 24 of the secondary fitting 10 is sized to be a press fit in the primary fitting 4 which has a smooth central cavity at the interface between the secondary fitting 10 and the central cavity of the primary fitting 4. Thus, to remove the tuning cable 5 from the hydraulic hose assembly 1 for tuning purposes, the connector 3 is disconnected from the other system component opposite from the end of the connector 3 that is attached to the hose 8. The tuning cable assembly 2 is removed from the connector 3 and a replacement tuning cable assembly 2 is installed and the connector 3 is reattached to the system component.

Now referring to FIG. 3 of the drawings, a cross-sectional view of a first alternative embodiment of the exemplary tuning cable retention structure 10' of the subject tuning cable assembly 2 is shown. The alternative secondary fitting 30 shown in FIG. 2 is structurally different than the secondary fitting 6 shown in FIG. 1. The secondary fitting 30 includes the upper section 32 which includes threads 34 and a lower section 36 that includes a receiving cavity 38. The tuning cable 5 is inserted into the receiving cavity 38 and the lower section 36 is crimped on the tuning cable 5 to hold it in the receiving cavity 38 to form the tuning cable retention structure 10'. A slot 39 is formed in the upper section 32 to provide for a tool that can be used to tighten the secondary fitting 30 into mating threads (not shown) formed in the inner wall of the primary fitting 4. To remove the tuning cable assembly 10' from the connector 3 without removing the hose 8 from the connector 3 and destroying the hose assembly 1, either the connector 3 is unscrewed from another hydraulic component or connector (not shown) and then the primary fitting 4 is unsecured from the connector 3 and then the tuning cable assemble 2 is removed for replacement. Alternatively, the secondary fitting 30 can be unscrewed from the primary fitting 4 while leaving the primary fitting 4 attached to the connector 3.

Now referring to FIG. 4 of the drawings, a second alternative embodiment of the exemplary tuning cable retention structure 10" of the subject tuning cable assembly 2 is shown. The alternative secondary fitting 40 consists of an upper section 42 which includes a flange 44 and a lower section 46 which includes a receiving cavity 48. The tuning cable 5 is inserted into the receiving cavity 48 and the lower section 46 is crimped around the tuning cable 5 to hold it into place to form the tuning cable retention structure 10". The tuning cable retention structure 10" has an outer diameter that provides for a slip fit into the primary fitting 4 or alternatively directly into the connector 3 without using a primary fitting 4. The upper section 44 has a frustoconical profile at its inlet end 44a that is shaped to provide a seal between it and another component in the hydraulic system. Alternatively, a separate seal can be used against the primary fitting 4. The alternative secondary fitting 46 does not require that a primary fitting 4 be used. Since it is a slip fit and the secondary fitting 46 crates a seal with the other component or connector (not shown) then a primary fitting 4 is not required. To remove the tuning cable assembly 2, the connector 3 is disconnected from the system component. Then the tuning cable retention structure 10" can be simply slipped out of the connector 3 and a replacement tuning cable retention structure substituted in its place. Note that FIGS. 2-4 show the lower sections 26, 36 and 46 prior to crimping onto the tuning cable 5. After crimping, the lower sections 26, 36, and 46 will have reduced diameters that blend with their respective upper sections 22, 32 and 42.

Now referring to FIG. 5 of the drawings, a cross-sectional exploded view of the exemplary tuning cable retention structure 10 is shown. The secondary fitting 20 has an upper section 24 and a lower section 26. The tuning cable 5 is inserted into the receiving cavity 28 (see FIG. 2) and the lower section is crimped onto the cable 5 to hold it in place. The primary fitting 4 has threads 4a to secure the primary fitting 4 to another component (not shown) but other types of connection methods could be used such as a push quick connect or a snap ring. Threads 4b are designed to mate with like threads formed within the connector 3. The inner diameter 4a of the primary fitting 4 is signed to yield a press fit between it and the upper section 24. The secondary fitting 20 and attached tuning cable 5 form the tuning cable retention structure 10 and when pressed into the primary fitting 4 to form the tuning cable assembly 2.

Now referring to FIG. 6 of the drawings, a cross-section exploded view of the first alternate embodiment tuning cable retention structure 10' is shown. The alternative secondary fitting 30 has threads 34 formed in the upper section 32 and a lower section 36. The tuning cable 5 is inserted into a receiving cavity (see FIG. 3) and the lower section 36 is crimped onto the tuning cable 5 to retain the cable 5 in place within the secondary fitting 30. The threads 34 mate with threads 4'*c* formed in the alternative primary fitting 4'. Outside threads 4'*a* and 4'*b* are formed on the outside of the primary fitting 4'. The threads 4'*a* mate with threads formed in another component in the hydraulic system. Threads 4'*b* mate with the connector 3. Thus, the tuning cable assembly 2 consists of the secondary fitting 30 the tuning cable 5 and the primary fitting 4'. This tuning cable assembly 2 can be threaded into the connector 3. The tuning cable retention structure 10' can then be removed from the primary fitting 4' by unthreading it. A new secondary fitting 30 and a new attached tuning cable 5 can be threaded into the primary fitting 4' and the hose 8 does not have to be destroyed.

Now referring to FIG. 7 of the drawings, a cross-sectional view of a second alternative embodiment of the tuning cable retention structure 10" is shown. The alternate secondary fitting 40 has an upper section 44 and a lower section 46. The upper section 44 has a frustoconical profile to seal with another system component (not shown) such as another connector or a pump or motor or valve assembly. The cable 5 is inserted into the secondary fitting 40 and the lower section 46 is crimped to hold the tuning cable 5 in place. The outside diameter of the lower section 46 is sized to provide a slip fit into the alternate connector 3'. The frustoconical section 3'*a* is congruent with the outside frustoconical shape of the upper section 44 of the secondary fitting 40. No primary fitting is needed but one could be used with the example components discussed previously. To assemble the components, the secondary fitting 40 with the attached cable 5 is inserted into the connector 3'. The assembly is then ready for connection to the hydraulic system. One type of connector 3' is shown but many other known connectors could be adopted to work with the exemplary system. In the alternative, the connector 3' can be connected another system component for securing the hose 8.

Figure 8:
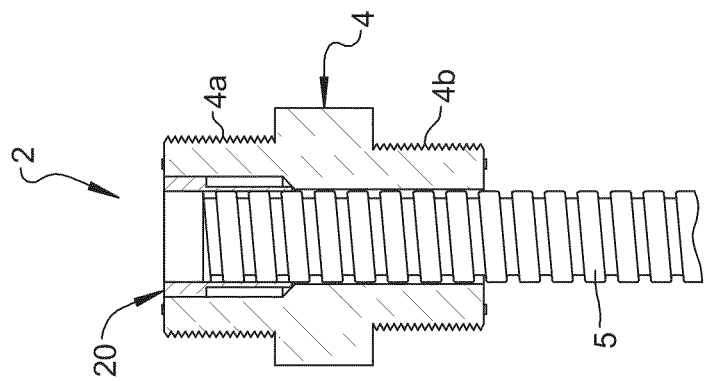
FIG. 8 is a cross-sectional view of the first exemplary tuning cable assembly.

Now referring to FIG. 8 of the drawings, a cross-sectional view of the exemplary tuning cable assembly 2 is shown. The components shown is exploded view shown in FIG. 5 are shown assembled to form the tuning cable assembly 2. The cable 5 has been secured within the secondary fitting by crimping and the secondary fitting 20 is then installed by pressing it into the primary fitting 4. Threads 4*a* and 4*b* connect to mating threads in another hydraulic system component and connector 3 respectively.

Figure 9:
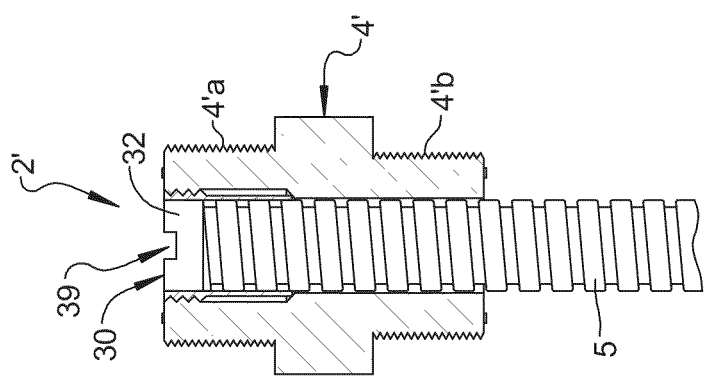
FIG. 9 is a cross-sectional view of the second exemplary tuning cable assembly.

Now referring to FIG. 9 of the drawings, a cross-sectional view of the first alternate embodiment of the exemplary tuning cable assembly 2' is shown. The components shown in the exploded view of FIG. 6 are shown assembled to form the tuning cable assembly 2'. The cable 5 has been secured within the secondary fitting 30 by crimping of the secondary fitting 30. The secondary fitting 30 is then inserted into the alternate primary fitting 30 and the threads formed on the inside wall of the primary fitting 4' secure the two components. Threads 4'*a* 4'*b* formed on the outside of the primary fitting 4' are used to connect the primary fitting 4' to another hydraulic system component or another connector and to the connector 3 respectively. Other methods of attachment can be used as are known in the art.

Now referring to FIG. 10 of the drawings, a cross-sectional view of the second alternative embodiment of the exemplary tuning cable assembly 2" is shown. The components shown in the exploded view of FIG. 7 are shown assembled to form the tuning cable 5 and connector 3' assembly. In an alternative configuration, the connector 3' can be secured to a second connector (not shown) for connection of the hydraulic hose 8. The secondary fitting 40 is slipped into the connector 3' after the tuning cable 5 is inserted into the secondary fitting 40 and crimped. The connector 3' is joined to another hydraulic system component (not shown). Seal 3'b provides a fluid seal between the other component and the connector 3'. In the alternative, the fluid seal can be established by using a system component that has a male frustoconical fitting that engages the female frustoconical shape 44a of the inlet of the secondary fitting 40.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. An apparatus for mounting a hydraulic tuning cable within a pressurized system comprising:
   a connector for attachment to the hydraulic system via a hose having an inner wall;
   a primary fitting having a central cavity, said primary fitting attached to said connector;
   a secondary fitting having an upper section adjacent a lower section and a receiving cavity, said receiving cavity removably retained within said central cavity of said primary fitting; and
   a tuning cable disposed within said central cavity and within said receiving cavity and passing along the inner wall and along an axial length of the hose;
   wherein said secondary fitting is removably retained within said central cavity of said primary fitting using mating threads; and
   wherein said lower section is crimped against said tuning cable.

2. The apparatus for mounting a hydraulic tuning cable of claim 1, wherein said upper section of said secondary fitting has a frustoconical shape for sealing with a hydraulic component.

3. The apparatus for mounting a hydraulic tuning cable of claim 1, wherein said secondary fitting includes a first set of threads projecting radially outwardly and said primary fitting includes a second set of threads projecting radially inwardly for selectively engaging said first set of threads.

4. The apparatus for mounting a hydraulic tuning cable of claim 1, wherein said primary fitting is unitary with said connector.

5. The apparatus for mounting a hydraulic tuning cable of claim 1, wherein said tuning cable is non-removably secured to said secondary fitting and said secondary fitting is removably retained within said primary fitting.

6. The apparatus for mounting a hydraulic tuning cable of claim 1, wherein said tuning cable is non-removably secured to said secondary fitting and at least one of (i) said secondary fitting is removably retained within said primary fitting; and (ii) said primary fitting is removably secured to said connector.

7. The apparatus for mounting a hydraulic cable of claim 6, wherein said connector is configured to be removably secured to the pressurized system.

8. The apparatus for mounting a hydraulic tuning cable of claim 1, wherein the receiving cavity of the secondary fitting, the central cavity of the primary fitting, an inner portion of the connector, and the hose all form a passageway through which the tuning cable passes.

9. The apparatus for mounting a hydraulic tuning cable of claim 1, wherein the tuning cable extends axially in at least one direction beyond the primary fitting and the secondary fitting.

10. The apparatus for mounting a hydraulic tuning cable of claim 1, wherein the tuning cable is a corrugated tube.

11. The apparatus for mounting a hydraulic tuning cable of claim 10, wherein the tuning cable includes ridges and grooves extending radially about the tuning cable.

12. An apparatus for mounting a hydraulic tuning cable within a pressurized system comprising:
   a connector for attachment, via a hose, to the hydraulic system;
   a primary fitting having a central cavity, said primary fitting attached to said connector;
   a secondary fitting having an upper section adjacent a lower section and a receiving cavity, said receiving cavity removably retained within said central cavity of said primary fitting; and
   a tuning cable disposed within said central cavity and within said receiving cavity;
   wherein said secondary fitting is attached to said connector using mating threads; and
   wherein the receiving cavity of the secondary fitting, the central cavity of the primary fitting, an inner portion of the connector, and the hose all form a passageway through which the tuning cable passes; and
   wherein the tuning cable is a corrugated tube.

13. The apparatus for mounting a hydraulic tuning cable of claim 12, wherein the tuning cable includes ridges and grooves extending radially about the tuning cable.

14. The apparatus for mounting a hydraulic tuning cable of claim 12, wherein the tuning cable extends axially in at least one direction beyond the primary fitting and the secondary fitting.

15. An apparatus for mounting a hydraulic tuning cable within a pressurized system comprising:
   a connector for attachment to the hydraulic system;
   a primary fitting having a central cavity, said primary fitting attached to said connector;
   a secondary fitting having an upper section adjacent a lower section and a receiving cavity, said receiving cavity removably retained within said central cavity of said primary fitting; and
   a tuning cable disposed within said central cavity and within said receiving cavity;

wherein said secondary fitting is removably retained within said primary fitting using mating threads; and wherein the tuning cable extends axially in at least one direction beyond the primary fitting and the secondary fitting.

16. The apparatus for mounting a hydraulic tuning cable of claim 15, wherein the receiving cavity of the secondary fitting, the central cavity of the primary fitting, an inner portion of the connector, and the hose all form a passageway through which the tuning cable passes.

17. The apparatus for mounting a hydraulic tuning cable of claim 15, wherein the tuning cable is a corrugated tube.

18. The apparatus for mounting a hydraulic tuning cable of claim 17, wherein the tuning cable includes ridges and grooves extending radially about the tuning cable.

* * * * *